Patented Dec. 19, 1944

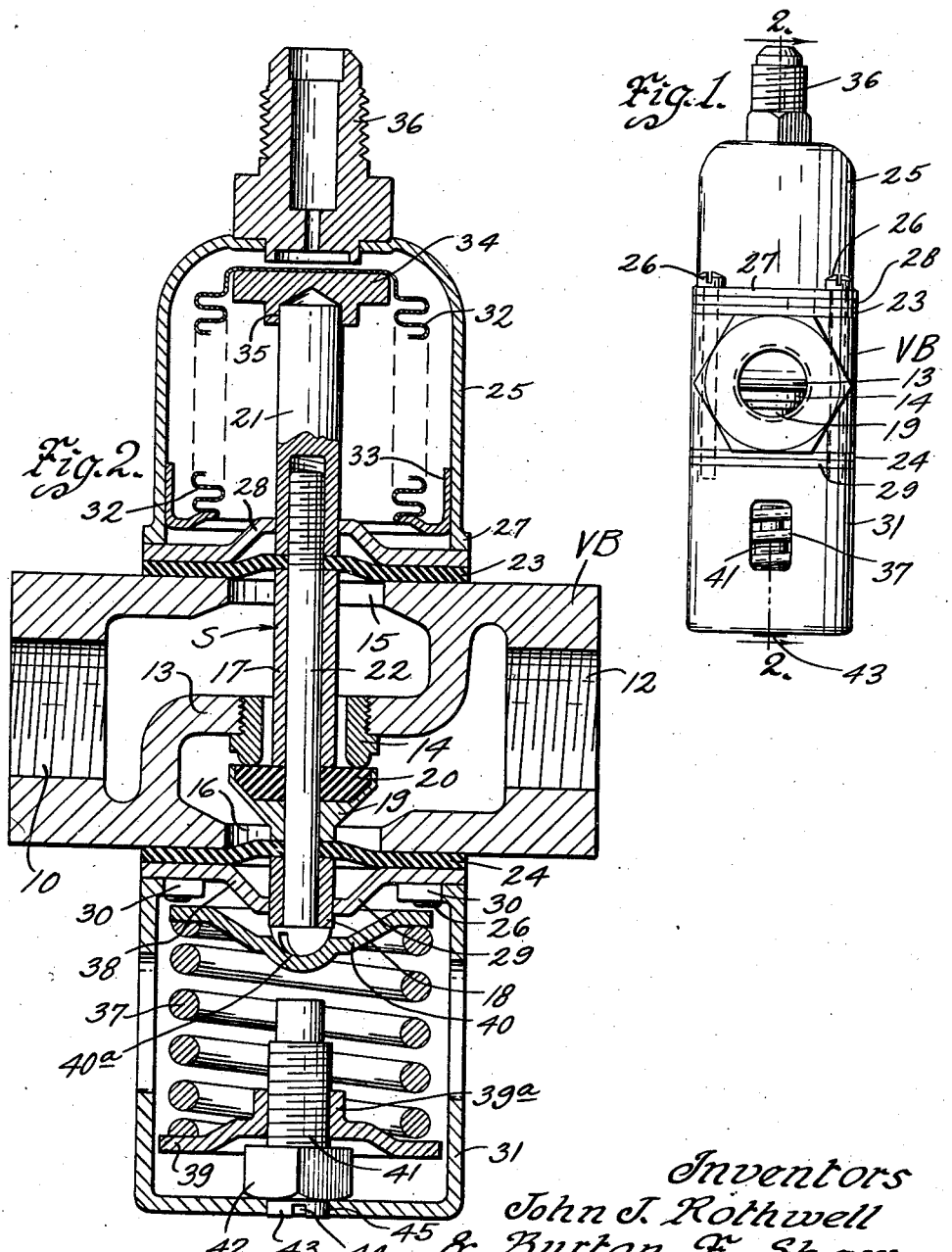

2,365,650

UNITED STATES PATENT OFFICE 2,365,650

WATER VALVE

Burton E. Shaw, Bristol, and John J. Rothwell, Elkhart, Ind., assignors to Penn Electric Switch Co., Goshen, Ind., a corporation of Iowa Application September 22, 1942, Serial No. 459,332

4 Claims. (Cl. 137—153)

Our present invention relates to a valve structure particularly adaptable for controlling the flow of cooling water to the condenser of a refrigeration system.

One object of the invention is to provide a valve structure which is balanced as to operation and yet is simple and inexpensive to construct.

A further object is to provide a valve structure designed to eliminate all packing glands and the attendant friction produced thereby.

Still a further object is to provide a water valve which is not subject to "hunting," and one wherein balance is secured against both inlet and outlet pressures regardless of whether the valve is closed or open.

More specifically, it is an object of our invention to provide a valve structure wherein a pair of diaphragms eliminates the necessity of any packing glands and seals off the valve plug relative to external atmosphere, a power element being then operatively associated with one end of an actuating stem projecting from one of said diaphragms and an external adjustable range spring being associated with the other end of the actuating stem projecting from the other diaphragm.

With these and other objects in view, our invention consists in the construction, arrangement and combination of the various parts of our device whereby the objects contemplated are attained, as hereinafter more fully set forth, pointed out in our claims and illustrated in the accompanying drawing, wherein:

Figure 1 is an elevation of a valve structure embodying our invention; and

Figure 2 is an enlarged vertical sectional view on the line 2—2 of Figure 1.

On the accompanying drawing we have used the reference character VB to indicate a valve body of comparatively simple shape, having an inlet 10 and an outlet 12. Between the inlet and the outlet a partition 13 is formed, into which a valve seat member 14 is screwed for the purpose of being removably and replaceably mounted therein.

The valve body VB has openings 15 and 16 on opposite sides of the valve seat member 14, and an actuating stem S projects through the valve seat and through the openings 15 and 16. The stem S comprises a pair of sleeves 17 and 18, a valve plug member 19, its composition sealing washer 20, a rod 21 and a tie bolt 22. The valve plug member 19 is interposed between the sleeves 17 and 18. Surrounding the tie bolt 22 and interposed between the elements 17 and 21 is a diaphragm 23, while, similarly, surrounding the tie bolt 22 and interposed between the elements 18 and 19 is a second diaphragm 24. When the tie bolt 22 is tightened, it effects a seal of the centers of the diaphragms 23 and 24 with respect to the stem S, and at the same time, all of the elements on the tie bolt are tightened in rigidly assembled position, with the washer 20 slightly compressed for seating it firmly in the cavity in the upper surface of the valve plug member 19.

The periphery of the diaphragm 23 is sealed relative to the valve body VB by a power element housing 25 and bolts 26 extending through a flange 27 thereof and then through a plate 28, the diaphragm 23, the valve body VB, the diaphragm 24 and a plate 29. The lower ends of the screws 26 are threaded into inturned lugs 30 of a range spring housing 31. Thus the peripheries of both diaphragms 23 and 24 are sealed relative to the valve body by the same means which connects the housings 25 and 31 to the valve body.

Within the housing 25 we provide a power element in the form of a collapsible bellows 32. The bellows 32 has its lower end soldered to a ring 33 which, in turn, is soldered to the housing 25 so that the interior of the housing surrounding the bellows forms a pressure chamber. The bellows 32 is provided with a head member 34 which has a socket 35 receiving the upper end of the rod 21 of the actuating stem S. A fitting 36 is soldered to the bellows housing 25 for connection to a pressure line such as the refrigerant line of a refrigeration system where the valve is installed as a water valve for the compressor thereof.

Within the spring housing 31 we provide a range adjusting spring 37, one end of which is seated against a washer 40 and the other against a washer 39. The washer 40 has a socket 40ᵃ fitting the head of the tie bolt 22, whereas the washer 39 has a threaded hub 39ᵃ receiving an adjusting screw 41. The head of the screw 41, indicated at 42, rests against the bottom of the spring housing 31, and has an extension 43 provided with a slot 44 to receive a screwdriver or other tool for rotating the adjusting screw. The extension 43 is rotatable in an opening 45 of the spring housing 31. The washer 39 is held against rotation as by being square in outline and contained in the housing 31 having a substantially square cross-section.

*Practical operation*

In the operation of our water valve the spring 37 normally keeps the washer 20 seated against the valve seat 14. When pressure builds up in the power element housing 25 to a predetermined point, it will open the valve against the bias of the return spring. Thus, build-up of refrigerant pressure, due to operation of the refrigeration system, will open the water valve to permit cooling water to flow through the condenser, and when the refrigeration system ceases to operate the drop of refrigerant pressure will permit the valve to go closed again, so that water is supplied to the condenser automatically, and only when needed (during operation of the refrigerant compressor).

By arranging the two diaphragms 23 and 24 as disclosed a balanced valve is secured, because inlet pressure from 10 acts against the diaphragm 23, and, at the same time, against the top of the valve plug 19. We have found that by having the diaphragm area slightly larger than the valve seat area, proper balance can be secured. Likewise, the outlet pressure is balanced against the diaphragm 24 and the bottom of the valve plug 19. These balanced conditions prevail when the valve is closed.

When the valve is open then the general pressure within the valve acts against the under surface of the diaphragm 23 and the upper surface of the diaphragm 24, and, these surfaces being equal, there is again a balanced condition so that the valve operates with comparatively little power, and is very sensitive to changes in pressure in the power element housing 25. At the same time, in addition to obtaining balance for the valve, all the packing glands are eliminated, and friction of the moving parts of the valve is reduced to a minimum. The valve stem S is retained in alignment by the washers 28 and 29 so as to reduce strain on the diaphragms during operation. Also, the assembly is such that a very simple casting is required for the valve body VB, and the use of only four screws assembles all the parts together, with the exception of the parts of the actuating stem S which are held assembled by the single tie bolt 22. Thus, a very simple construction is obtained with but few parts, and the result is a very efficiently operating valve structure.

Some changes may be made in the construction and arrangement of the parts of our device without departing from the real spirit and purpose of our invention, and it is our intention to cover by our claims any modified forms of structure or use of mechanical equivalents which may be reasonably included within their scope without sacrificing any of the advantages thereof.

We claim as our invention:

1. In a valve structure comprising a valve body having an inlet, an outlet and a valve seat between said inlet and said outlet, said valve body having openings on opposite sides of said valve seat, an actuating stem projecting through both of said openings and through said seat, a valve plug carried by said actuating stem, said actuating stem including sleeves on opposite sides of said valve plug, a tie bolt through said sleeves and plug and an actuating rod into which said tie bolt is threaded, a diaphragm spanning each of said openings and surrounding said tie bolt, one of said diaphragms being interposed between one of said sleeves and said valve plug and the other of said diaphragms being interposed between the other of said sleeves and said actuating rod, a power element beyond one of said diaphragms and operatively connected with said actuating rod, a housing for said power element adjacent said valve body with the periphery of one of said diaphragms interposed therebetween, a return spring beyond the other of said diaphragms and tending to seat said valve plug against said valve seat, a housing for said return spring adjacent said valve body with the periphery of the other of said diaphragms interposed therebetween, and through-bolts extending through a flange of said power element housing, said diaphragms, said valve body, and a flange of said spring housing for retaining the parts just enumerated in assembled relation to each other.

2. In a valve structure of the character disclosed, a valve body having an inlet, an outlet and a valve seat between said inlet and said outlet, said valve body having openings on opposite sides of said valve seat, an actuating stem projecting through both of said openings and through said seat, a valve plug carried by said actuating stem, said actuating stem including sleeves on opposite sides of said valve plug, a tie bolt through said sleeves and plug and an actuating rod into which said tie bolt is threaded, a diaphragm spanning each of said openings and surrounding said tie bolt, one of said diaphragms being interposed between one of said sleeves and said valve plug and the other of said diaphragms being interposed between the other of said sleeves and said actuating rod, a pair of guide washers having perforations through which one of said sleeves and said actuating rod slide, a power element beyond one of said diaphragms and operatively connected with said actuating rod, a housing for said power element, a return spring beyond the other of said diaphragms and tending to seat said valve plug against said valve seat, a housing for said return spring, and means for assembling the parts of said valve comprising through-bolts extending through a flange of said power element housing, said guide washers, said diaphragms, said valve body, and a flange of said spring housing.

3. In a valve structure, a valve body having an inlet, an outlet and a valve seat between said inlet and said outlet, said valve body having openings on opposite sides of said valve seat, an actuating stem projecting through both of said openings and through said seat, a valve plug carried by said actuating stem, a diaphragm spanning each of said openings and surrounding said stem, a power element beyond one of said diaphragms and operatively connected with said stem, a housing for said power element adjacent said valve body with the periphery of one of said diaphragms interposed therebetween, a return spring beyond the other of said diaphragms and tending to seat said valve plug against said valve seat, a housing for said return spring adjacent said valve body with the periphery of the other of said diaphragms interposed therebetween, and through-bolts extending through a flange of said power element housing, said diaphragms, said valve body, and a flange of said spring housing to retain said valve body, diaphragms and housings assembled.

4. A valve structure comprising a valve body having an inlet, an outlet and a valve seat between said inlet and said outlet, said valve body having openings on opposite sides of said valve seat, an actuating stem projecting through both of said openings and through said valve seat, a valve plug carried by said actuating stem, said actuating stem including sleeves on opposite sides of said valve plug, a tie bolt through said sleeves and valve plug and an actuating rod into which said tie bolt is threaded, a diaphragm spanning each of said openings and surrounding said tie bolt, one of said diaphragms being interposed between one of said sleeves and said valve plug and the other of said diaphragms being interposed between the other of said sleeves and said actuating rod, a power element beyond one of said diaphragms and operatively connected with said actuating rod, a housing for said power element secured to said valve body with the periphery of one of said diaphragms interposed therebetween, a return spring beyond the other of said diaphragms and tending to seat said valve plug against said valve seat, and a housing for said return spring secured to said valve body with the periphery of the other of said diaphragms interposed therebetween.

BURTON E. SHAW.
JOHN J. ROTHWELL.